United States Patent [19]

Krones

[11] Patent Number: 5,513,105
[45] Date of Patent: Apr. 30, 1996

[54] VEHICLE SECURITY SYSTEM

[76] Inventor: Daniel K. Krones, 33902-B Golden Lantern, Dana Point, Calif. 92629-2320

[21] Appl. No.: 251,213

[22] Filed: May 31, 1994

[51] Int. Cl.$^6$ ................................................. B60R 25/04
[52] U.S. Cl. .......................... 364/424.01; 307/10.5; 180/287; 340/506; 340/825.34
[58] Field of Search ................ 364/424.01; 340/64, 340/825.31, 426, 825.34, 506; 307/10 AT, 10.3, 10.2, 10.5; 180/287; 70/257

[56] References Cited

U.S. PATENT DOCUMENTS

| | | | |
|---|---|---|---|
| 4,327,353 | 4/1982 | Beard et al. | 340/64 |
| 4,672,225 | 6/1987 | Hanisko et al. | 307/10 AT |
| 4,754,255 | 6/1988 | Sanders et al. | 340/64 |
| 4,777,377 | 10/1988 | Jeter | 307/10 AT |
| 4,804,856 | 2/1989 | Hanisko et al. | 307/10 AT |
| 4,852,680 | 8/1989 | Brown et al. | 180/287 |
| 4,914,314 | 4/1990 | Hirtz | 307/10.3 |
| 4,965,460 | 10/1990 | Tanaka et al. | 307/10.2 |
| 4,966,019 | 10/1990 | Hoffman et al. | 70/257 |
| 4,990,906 | 2/1991 | Kell et al. | 340/825.31 |
| 5,019,812 | 5/1991 | Gostahagberg et al. | 340/825.31 |
| 5,049,867 | 9/1991 | Stouffer | 340/426 |
| 5,079,435 | 1/1992 | Tanaka | 307/10.2 |
| 5,133,426 | 7/1992 | Niriella et al. | 180/287 |
| 5,229,648 | 7/1993 | Sues et al. | 307/10.2 |
| 5,315,286 | 5/1994 | Nolan | 340/426 |

Primary Examiner—Kevin J. Teska
Assistant Examiner—Russell W. Frejd
Attorney, Agent, or Firm—Roy A. Ekstrand

[57] ABSTRACT

A processor includes a keyport located within a vehicle interior. The keyport is operative in combination with a computerized key capable of transmitting a numeric digital signal through the keyport to the processor and controller, The processor and controller is further coupled to a piezo-electric sounding element and to a control relay. The latter is inserted within the starting circuit of the host vehicle at a critical location which enables the relay to interrupt the vehicle starting circuit and render the engine of the vehicle unable to be started despite the use of the normal vehicle ignition key, The system is programmed by presentation of a computerized key to the key receptacle and maintaining the key within the receptacle for a predetermined time interval, The system is also operable in a valet mode in which the security system is temporarily disabled or in an any key mode in which the vehicle may be enabled by presentation of any computerized key having a numeric code within a predetermined family of numbers, The system also provides for the reprogramming of the processor and controller to accept new replacement keys in the event the user has lost the authorized keys. The system accommodates more than one key.

14 Claims, 5 Drawing Sheets

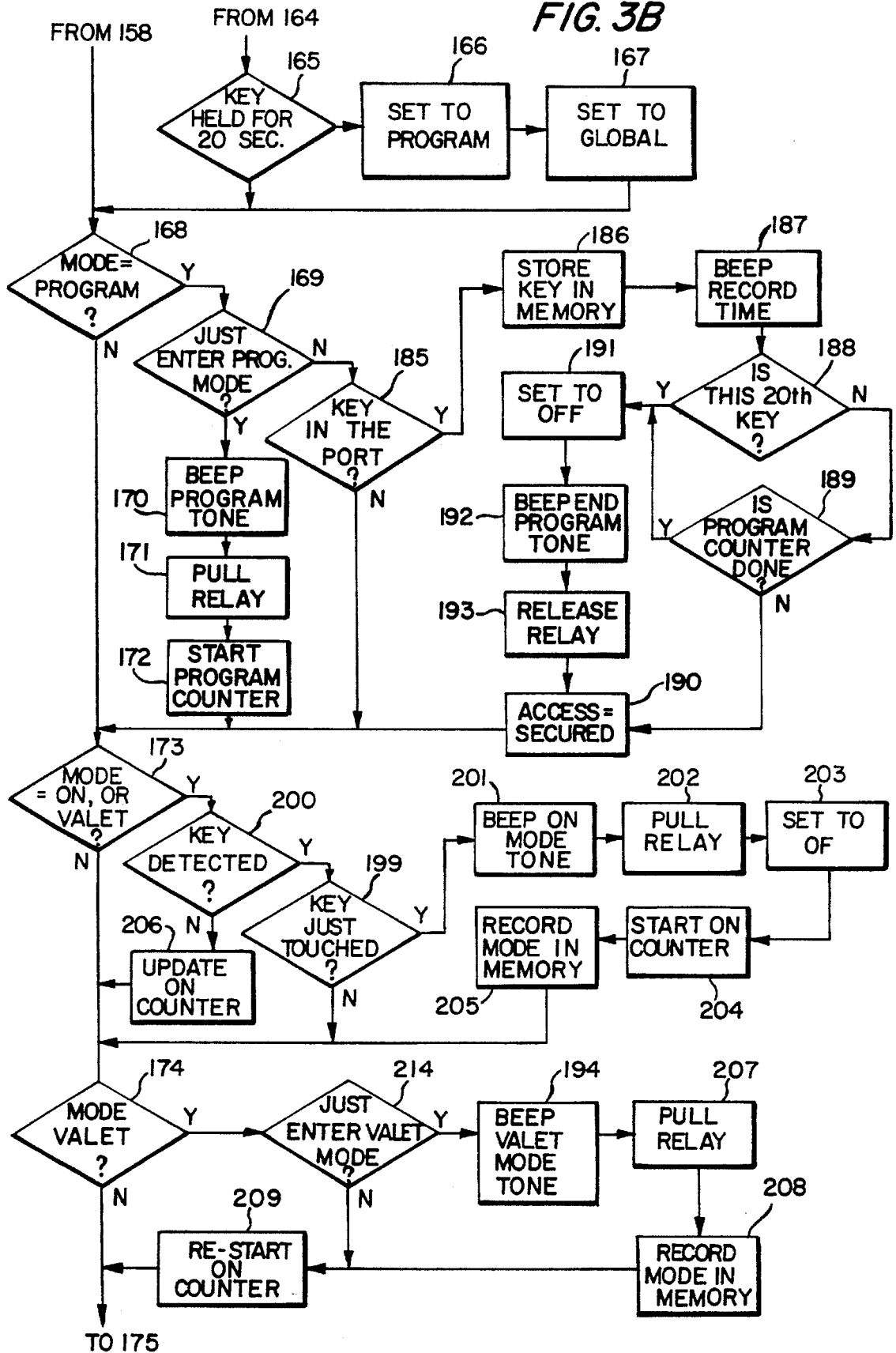

VEHICLE SECURITY SYSTEM

FIELD OF THE INVENTION

This invention relates generally to motor vehicle security systems and particularly to those which operate to disable the motor vehicle.

BACKGROUND OF THE INVENTION

Thefts of motor vehicles have become a serious problem on a virtually worldwide basis. Even more troubling is the clear indication that the problem of vehicle theft is likely to become more serious in the future. The ever increasing number of motor vehicles operated throughout the world together with the greatly increased cost or value of such vehicles leads to ample opportunity and motivation for vehicle thieves. The lifestyle of most motor vehicle owners further exacerbates the problem in that such vehicles are often parked and left unattended for extended periods of time such as all or part of a workday in exposed generally unsecured areas. In addition, vehicle owners are often required by their various needs to park motor vehicles in questionable areas or neighborhoods while they attend to necessary business, amusement or entertainment. Law enforcement officials are simply overwhelmed by the sheer number of motor vehicle thefts and the number of vehicles to be protected and as a result are generally unable to provide any kind of preventative security for motor vehicle owners generally.

As a result of this ever increasing problem, consumer demand for vehicle security systems has risen sharply and shows every evidence of continuing to rise. In the face of such urgent consumer demand, practitioners in the art have endeavored to provide a number of vehicle security systems. These vehicle security systems have assumed a virtually endless variety and extend from relatively simple physical barrier systems to high technology complex systems utilizing sophisticated transmitting and tracking capability. For example, the physical barrier types of vehicle security systems utilize a lockable device usually within the vehicle interior to secure the steering wheel or one or more of the vehicle pedals in an inoperative position. The intent in such physical barrier systems is to simply provide a high visibility deterrent to vehicle thieves and to render the vehicle difficult to operate. Other systems generally referred to as alarm systems utilize various sensors throughout the vehicle to detect tampering or forced entry of the vehicle and thereafter trigger a barrage of sound and flashing lights often using the vehicle horn and lighting system. Still other types of vehicle security systems rely upon disabling the vehicle and rendering it inoperative to the would-be thief. One such system utilizes a multiple contact socket disposed within the vehicle interior which requires the insertion of an appropriately configured or coded key having an interconnecting contact set disposed therein for operation of the vehicle. The recovery aid type vehicle security systems operate from a somewhat different perspective in that they become effective once the vehicle has been taken by the thief to provide tracking information transmissions which a monitoring system utilizes to continuously locate the vehicle and thereby aid law enforcement officials in recovering it.

While the foregoing described prior art systems have enjoyed some measure of success, they generally remain limited in their performance and are often cumbersome or impractical in use. For example, most such systems are relatively inflexible and are not easily adapted to the user's needs. This inflexibility often leads to a compromising of the vehicle security integrity to meet typical lifestyle needs of the user. Several situations repeatedly arise in most vehicle use which are accommodated by compromising vehicle security. For example, situations in which vehicles are valet parked or in which the bonified owner of the vehicle loses the vehicle keys as well as needs to add new drivers or temporarily loan the vehicle to another operator inherently raise situations in which vehicle security is compromised as the situations are accommodated.

There remains, therefore, a continuing need in the art for evermore improved vehicle security systems which exhibit flexibility and which nonetheless maintain vehicle security without compromise.

SUMMARY OF THE INVENTION

Accordingly, it is a general object of the present invention to provide an improved vehicle security system. It is a more particular object of the present invention to provide an improved vehicle security system which maintains sufficient flexibility to accommodate the anticipated needs of the vehicle operator without unduly compromising vehicle security.

In accordance with the present invention, there is provided a vehicle security system comprising: means for disabling the vehicle by preventing operation of its engine; a computerized key having means for transmitting a key number; a keyport having means for coupling to the computerized key; indicator means for producing system response indications; memory means for storing a plurality of authorized key numbers; and processor means coupled to the memory means, the keyport, the means for disabling and the indicator means and having means for receiving the key number and for determining whether the key number matches one of the authorized key numbers, the processor means causing the means for disabling to disable the vehicle and maintaining it disabled until the computerized key is received within the keyport and determined to match one of the authorized key numbers and causing the indicator means to produce a system response indicator indicative of acceptance of the computerized key and activation of the vehicle in response to the match.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIGS. 3A through 3C taken together set forth an operational flow diagram of the present invention vehicle security system.

DESCRIPTION OF THE PREFERRED EMBODIMENT

Figure 1:
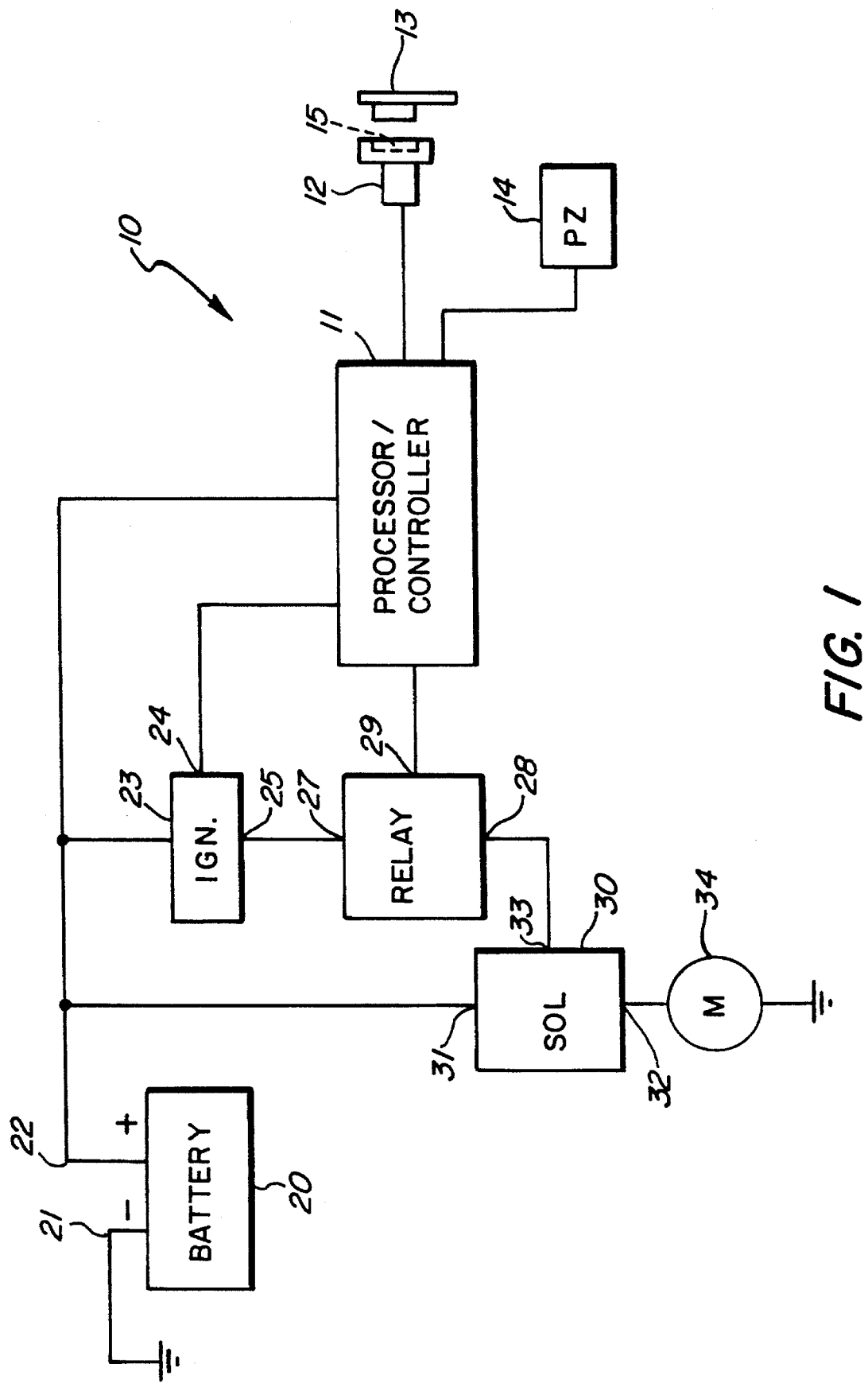
FIG. 1 sets forth a block diagram of the present invention system installed within a typical vehicle.

FIG. 1 sets forth a block diagram of the present invention vehicle security system generally referenced by numeral 10 coupled to a typical motor vehicle engine starting system.

Figure 2:
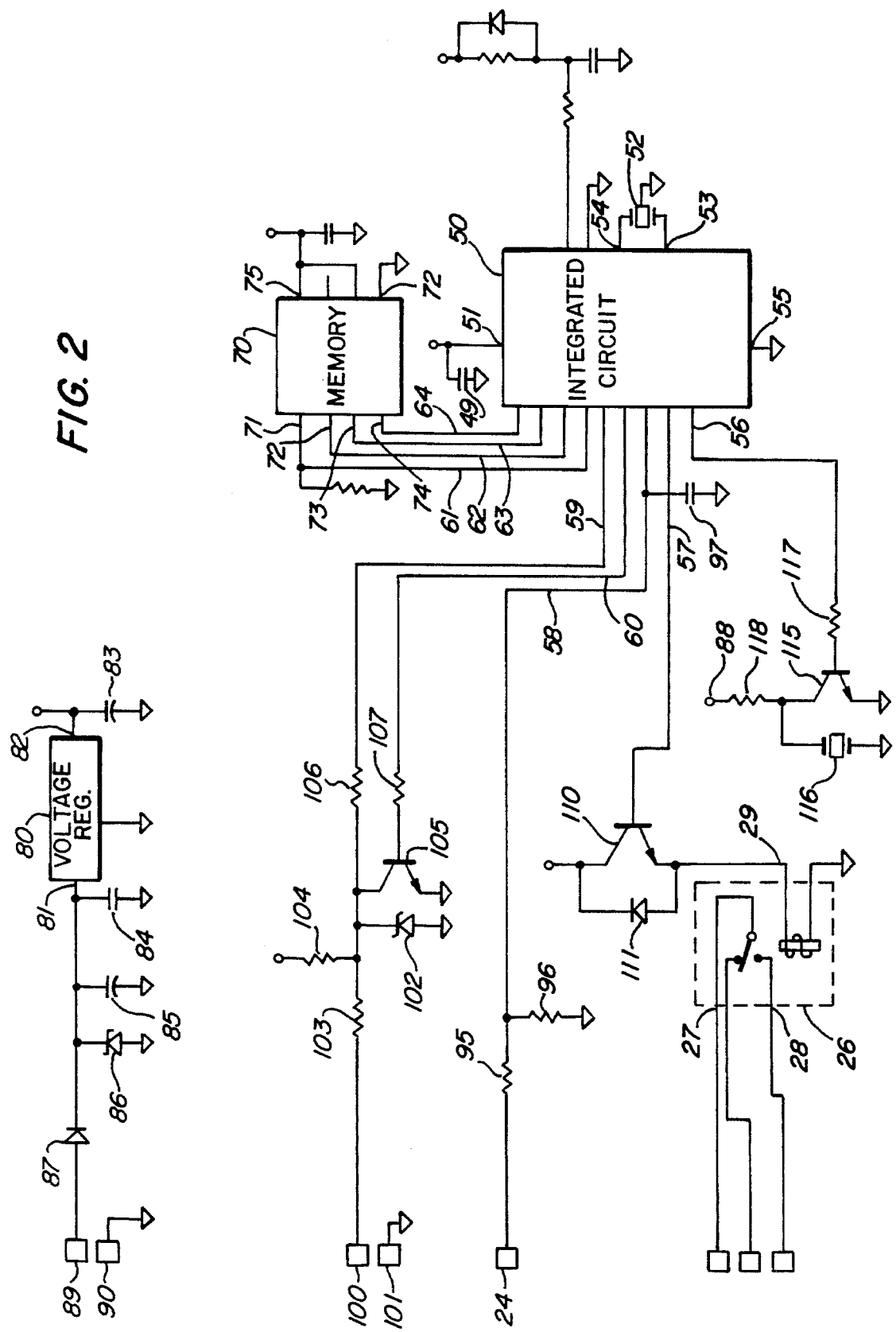
FIG. 2 sets forth a schematic diagram of the present invention vehicle security system.

Vehicle security system 10 includes a processor and controller circuit 11 together with a normally open relay 26, a piezoelectric sounding device 14 and a keyport 12 all coupled operatively to processor 11 in the manner set forth in FIG. 2 in greater detail. Keyport 12 defines a key receptacle 15 shown in dashed-line representation. In accordance with conventional fabrication techniques, the host vehicle electrical system includes a conventional battery 20 having a negative terminal 21 coupled to ground and a positive terminal 22. Positive terminal 22 is coupled to a starter motor 34 via a starter solenoid 30 at motor current connections 31 and 32. Solenoid 30 further includes a switching input 33. In further accordance with conventional fabrication techniques, a conventional vehicle ignition switch 23 is coupled to positive terminal 22 of battery 20 and includes a switched battery voltage output 24 and a starter solenoid output 25. Output 25 is coupled to switching input 33 of solenoid 30 via terminals 27 and 28 of normally open relay 26. Relay 26 is controlled by the voltage applied to input 29 which is coupled to processor 11. Switched voltage output 24 together with positive battery voltage 22 are also coupled to processor 11. A key 13 configured to be partially received within receptacle 15 in its preferred form includes a computerized key having a unique digitally encoded number stored therein which is transmitted to keyport 12 in the form of a forty-eight bit serial number each time key 13 is inserted into receptacle 15. While different key fabrications may be utilized to provide the transmission of the unique identifier number utilized in the present invention system, it has been found particularly advantageous to utilize a computerized key of the type manufactured and sold by Dallas Semiconductor Corporation under the trademark DS1990 Touch Serial Number. Piezoelectric sound producing device 14 is constructed in accordance with conventional fabrication techniques and is preferably configured to provide audible sound under the control of processor and controller 11.

Battery 20, solenoid 30, motor 34 and ignition switch 23 operate in accordance with conventional fabrication techniques which are best explained by temporarily omitting the operation of normally open relay 26. Thus, in accordance with normal vehicle operation, ignition switch 23 controls the operation of solenoid 30 and thereby controls the operation of motor 34. More specifically, the power coupling for motor 34 to battery 20 is provided through solenoid 30 under the control of solenoid switch 30 which in turn responds to the input voltage at input 33. As the user activates the vehicle, ignition switch 23 is turned by the user's conventional vehicle key to provide coupling between battery 22 and output 25 of switch 23. Once again, omitting the operation of relay 26, the switching of ignition switch 23 to provide battery voltage coupling to output 25 is applied to input 33 causing solenoid switch 30 to conduct between terminals 31 and 32 thereby coupling motor 34 effectively to positive output 22 of battery 20 which in turn starts the vehicle.

In accordance with the present invention, relay 26 is inserted between ignition switch 23 and input 33 of solenoid 30 in the manner shown in FIG. 1. Relay 26 may be constructed in accordance with conventional fabrication techniques and forms a normally open relay characterized by an open circuit condition between terminals 27 and 28 in the absence of an energizing input at control input 29. Thus, so long as relay 26 remains open, solenoid switch 30 is not energized despite the vehicle operator's appropriate manipulation of ignition switch 23 using the conventional vehicle ignition key. With relay 26 installed in the manner shown in FIG. 1 and in accordance with an important aspect of the present invention, the host vehicle will not start until input 29 of relay 26 is energized which in turn is determined by processor and controller 11. Thus, processor and controller 11 using relay 26 is able to render the host vehicle completely inoperative and unable to be started thereby effectively operating as a security system.

In the normal operation of vehicle security system 10, the user enters the vehicle in possession of computerized key 13 which processor 11 in accordance with the programming operation described below, has been programmed to accept. Suffice it to note here that processor and controller 11 may be programmed to accept and recognize authorization of a plurality of computerized keys each having individual uniquely identifying digital numbers stored therein. As the user prepares to initiate the starting of the host vehicle, the user simply touches key 13 to receptacle 15 of keyport 12. By means set forth below in greater detail, processor and controller 11 responds to the presence of key 13 within receptacle 15 and cooperates therewith to initiate transmission of a forty-eight bit serial number from key 13 to processor and controller 11. Processor and controller 11 then determines whether key 13 has transmitted a digital number which is authorized and, upon recognizing an authorized key, energizes piezoelectric sound producing device 14 to produce a pair of short audio beeps to indicate to the user that the system is energized. Concurrently, processor and controller 11 upon recognizing key 13 energizes normally open relay 26 causing it to close and couple ignition switch terminal 25 to terminal 33 of starter solenoid 30. At this point, the user is able to start the host vehicle by turning the vehicle ignition key within ignition switch 23 in accordance with conventional vehicle operation.

In the event key 13 transmits a digital number to processor 11 which is not an authorized number, processor and controller 11 simply remains inoperative and relay 26 is not energized. In the absence of energizing of relay 26, an open circuit condition remains between ignition switch 23 and starter solenoid 30 and the host vehicle remains disabled. In the disabled condition, no manipulation of ignition switch 23 is able to start the host vehicle.

In accordance with the present invention, processor and controller 11 provides for operation of vehicle security system 10 in three different operative modes to suit the various needs of the user. Each of the operational modes is determined or imposed upon processor and controller 11 through the manipulation of key 13 within keyport 12 as described below. Suffice it to note here that processor and controller 11 operates vehicle security system 10 in either a normal mode described above in which the vehicle security system responds to the application of any one of the previously authorized keys in the manner described above or, alternatively, vehicle security system may be operated in a global or "any key mode" in which processor 11 will enable the host vehicle so long as any computerized key such as key 13 is placed within receptacle 15 of keyport 12 while maintaining the vehicle inoperative in the absence of a computerized key. Finally, processor and controller 11 will also operate vehicle security system 10 in a "valet mode" in which the need for application of any computerized key such as key 13 within keyport 12 is eliminated and the host vehicle may be operated normally using the appropriate ignition key within ignition switch 23.

Thus, the present invention system is able to accommodate the various needs of the user without compromising the integrity of the computer system. For example, the use of the present invention system in the any key mode facilitates operation of the vehicle by a large number of persons so long as they possess one of the computerized keys. By way of further example, the operation of the present invention system in the valet mode permits the vehicle operator to temporarily disable the present invention security system without the need for entrusting an authorized key to the parking attendant or other individual to whom the vehicle is being entrusted. In all circumstances, the mode of operation of the present invention vehicle security system is easily changed between operating modes in the manner described below by simple manipulation of the user's authorized key.

In most instances, the present invention vehicle security system will be initially programmed by the vehicle owner once the system is installed or delivery of the vehicle having the system installed therein has taken place. In accordance with the present invention, the user is able to enter the program mode in which the processor and controller key authorization is implemented by initially holding the user's key such as key 13 against keyport 12. Processor 11 responds to the presence of key 13 within keyport 12 to receive the forty-eight bit serial number from key 13. Once the identifying number of key 13 has been received, processor and controller 11 energizes audio output device 14 to produce a pair of short beep tones. The user continues to maintain the position of key 13 within keyport 12 to indicate to processor and controller 11 that the program mode is to be entered. Following a brief interval of approximately five seconds, processor and controller 11 signals the entry of the valet mode by producing two long audio beeps using audio output 14. The user continues maintaining the position of key 13 within keyport 12 until the program mode is complete. In global mode, processor and controller 11 produces a series of four short beep tones and one long beep tone using output device 14. The latter signals the implementation of a predetermined program period in which processor and controller 11 will authorize any key such as key 13 which the user applies to keyport 12. Thus, during this interval which preferably lasts approximately three minutes, the user may authorize a plurality of keys by simply applying each key to keyport 12 causing processor and controller 11 to receive the transmitted digital number therefrom and to store the key identifier number in the authorized key list. Processor and controller 11 produces a short beep tone each time the key number has been stored indicating to the user that the next key to be authorized may be applied to keyport 12. This sequence is repeated for the desired number of keys which the user desires to have authorized to operate the vehicle. Once the program mode interval has expired, or once the maximum allowable number of keys have been entered, processor and controller 11 will cease accepting computerized keys for authorization and will terminate the program mode producing a long beep signal to indicate the end of programming mode operation. In the present embodiment, the memory size selected limits the system to twenty authorized keys. However, a different number may be used as desired with corresponding memory capacity being provided.

Once the above-described programming operation is complete, the present invention vehicle security system operates in the above-described normal operations mode in which processor and controller 11 closes relay 26 solely in response to the application of an authorized computerized key at keyport 12.

In accordance with an important aspect of the present invention, the user having any authorized key is able to program vehicle security system 10 to accept any computerized key by simply applying an authorized key to keyport 12 and maintaining the key within the keyport while processor and controller 11 enters the program mode and sequences through the two short beeps indicating key recognition followed by two long beeps indicating entrance into the valet mode and four short beeps and one long beep indicating the entrance of processor and controller 11 into the program mode in which keys may be authorized. The user enters the any key mode by simply removing the applied key and allowing the three-minute program interval to pass without the application of any keys to keyport 12. Upon expiration of the three-minute program period without any key having been applied, processor and controller 11 terminates the program mode and is now configured to accept any key.

In further accordance with the present invention, vehicle security system 10 may be configured in the valet mode by simply applying an authorized key to keyport 12 and maintaining the key application until processor and controller 11 has completed key recognition indicated by two short beep tones followed by initiation of the valet mode indicated by two long beep tones afterwhich the user removes the applied key. Processor and controller 11 then configures the present invention vehicle security system in the valet mode in which the application of a computerized key is no longer required to operate the vehicle and normally open relay 26 is energized each time the user operates ignition switch 23 in the normal vehicle starting manner.

In further accordance with the present invention, vehicle security system 10 is also able to accommodate the loss of computerized keys by the user. The system may be reprogrammed after the vehicle owner has obtained additional computerized keys. The reprogramming or lost key programming of the present invention vehicle security system is implemented by initially disconnecting positive battery terminal 22 from processor and controller 11 for an interval of approximately ten seconds and thereafter reconnecting positive terminal 22 and avoiding operation of the vehicle or application of any key to keyport 12 for a thirty-minute period. Upon completion of the thirty-minute waiting period, processor and controller 11 produces three short beep tones and initiates a thirty second interval during which it reenters the program mode and will accept authorization of the user's new keys in the manner described above.

Thus, it will be apparent to those skilled in the art that the present invention vehicle security system is extremely simple and flexible for the vehicle operator. Of particular advantage is the ability of the present invention vehicle security system to be readily programmed in each of its operative modes by simple application of an authorized key to keyport 12.

FIG. 2 sets forth a schematic diagram of vehicle security system 10. System 10 includes an integrated circuit 50 constructed in accordance with conventional fabrication techniques and having a general device number 16C54RC/P. Integrated circuit 50 is generally referred to as a microcontroller and is configured in the present invention system to provide a processor. For ease of understanding, the pin identifying numbers have been maintained in FIG. 2 and are positioned adjacent each of the pin connections for integrated circuit 50. A conventional crystal 52 is coupled to oscillator inputs 53 and 54 of integrated circuit 50 while a source of operating supply voltage together with a filter capacitor 49 are coupled to voltage supply input 51 of integrated circuit 50. Integrated circuit 50 includes a ground terminal 55 and an audio output terminal 56. The latter is coupled to the base of an NPN transistor 115 via a resistor 117. Transistor 115 includes a collector load 118 coupled to a source of vehicle battery voltage 88. The collector of transistor 115 is coupled to a piezoelectric audio output element 116. Integrated circuit 50 further includes a relay output terminal 57 coupled to the base of a relay driver transistor 110. Transistor 110 includes a protective diode 111 coupled between its emitter and collector and forms an emitter follower stage having its emitter electrode coupled to energizing input 29 of relay 26. As described above, relay 26 is interposed between ignition switch 23 and starter solenoid 30 (seen in FIG. 1) and is used in a normally open configuration. Accordingly, common terminal 27 is coupled to ignition switch 23 while normally open terminal 28 is coupled to solenoid 30 (both seen in FIG. 1). Integrated circuit 50 further includes an ignition signal input 58 which is coupled to switched ignition terminal 24 of ignition switch 23 (seen in FIG. 1) by a pair of resistors 95 and 96. Integrated circuit 50 further includes a key data input terminal 59 and a key data output terminal 60. Data input terminal 59 is coupled to an input terminal 100 of keyport 12 (seen in FIG. 1) by a plurality of resistors 103 and 106. Key data output terminal 60 of integrated circuit 50 is coupled to the base of a driver transistor 105 by a resistor 107. A zener diode 102 is coupled in parallel with transistor 105. A collector resistor 104 couples the collector of transistor 105 to a source of operating supply voltage.

A memory chip 70 comprises a conventional memory device having a general device number 93LC46/P. To aid the reader in understanding the application of memory device 70, the standard pin numbers associated with memory device 70 are included at each terminal thereof. Memory device 70 includes a clock input terminal 72 coupled to a clock signal output 62 of integrated circuit 60. Memory device 70 further includes a data input terminal 73 and a data output terminal 74 coupled to data output 63 and data input 64 of integrated circuit 50. Memory device 70 further includes an operating supply input 75 coupled to a source of operating voltage and a ground terminal 72 coupled to ground.

Vehicle security system 10 further includes a voltage regulator 80 constructed in accordance with conventional fabrication techniques and comprising a standard voltage regulating device having a standard device number MC7805T. Voltage regulator 80 includes an input terminal 81 coupled to positive terminal 22 of vehicle battery 20 (seen in FIG. 1) and an output terminal 82 which provides operating supply voltage for the remainder of vehicle security system 10 and which is labeled in FIG. 2 as "VCC". In accordance with conventional voltage regulation techniques, input terminal 81 is coupled to a pair of filter capacitors 84 and 85 and a zener diode 86. A filter capacitor 83 is applied to output 82 to provide filtering of the operating supply voltage.

In operation, integrated circuit 50 responds to the application of a computerized key at input terminals 100 and 101 in the manner described above to initiate a data transfer between the applied key and data input terminal 59. Crystal 52 provides a standardized frequency reference for integrated circuit 50 for use in the internal clock function within integrated circuit 50. Integrated circuit 50 produces audio output signals at output 56 which are amplified by transistor 115 and used to energize piezoelectric device 116. Integrated circuit 50 further produces an output signal at relay output terminal 57 which is amplified by emitter follower transistor 110 to control relay 26 in the manner described above. Voltage regulator 80 functions in accordance with conventional fabrication techniques to maintain a regulated output supply voltage which is utilized by vehicle security system 10.

Figure 3A:
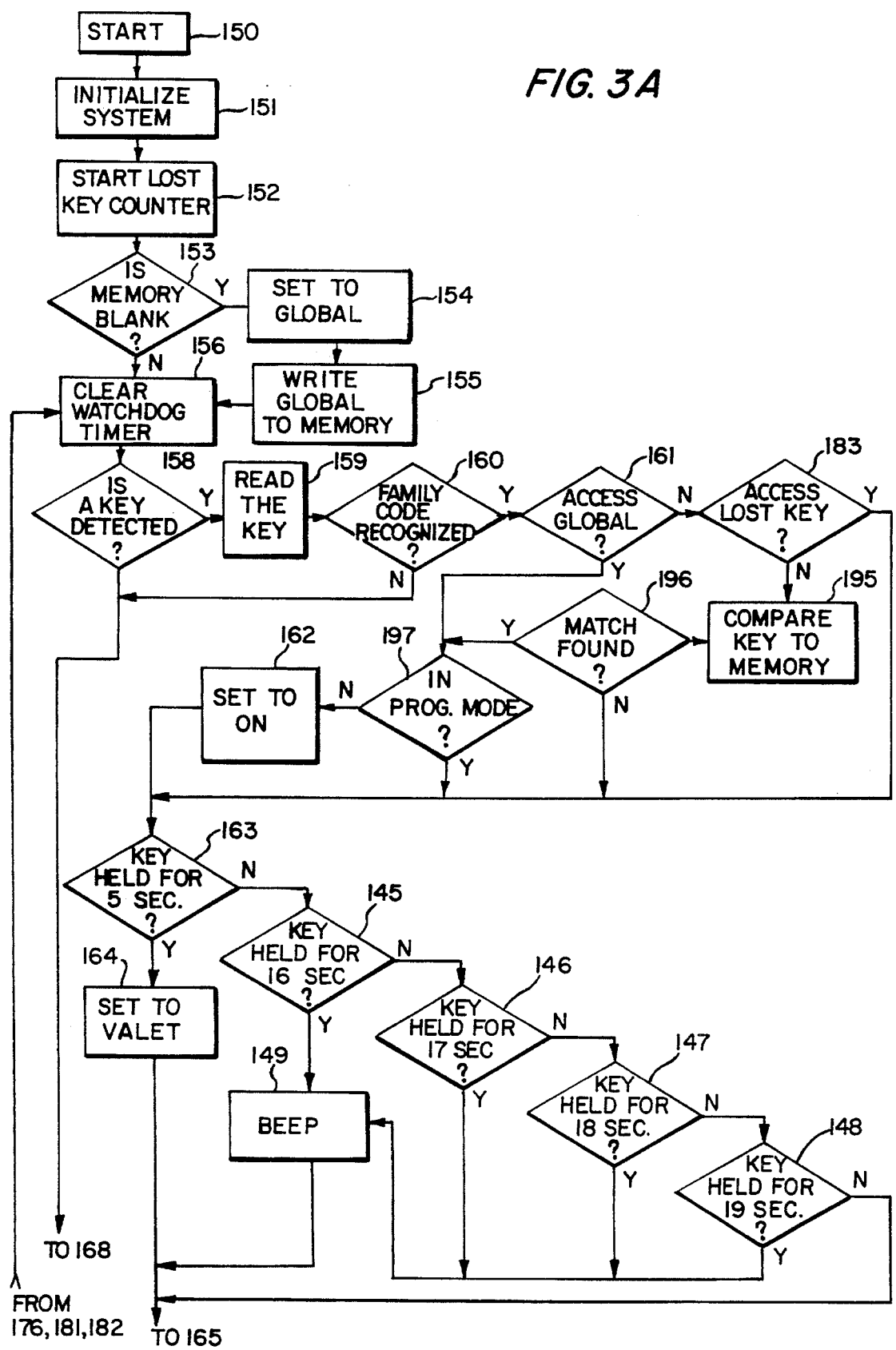
Figure 3C:
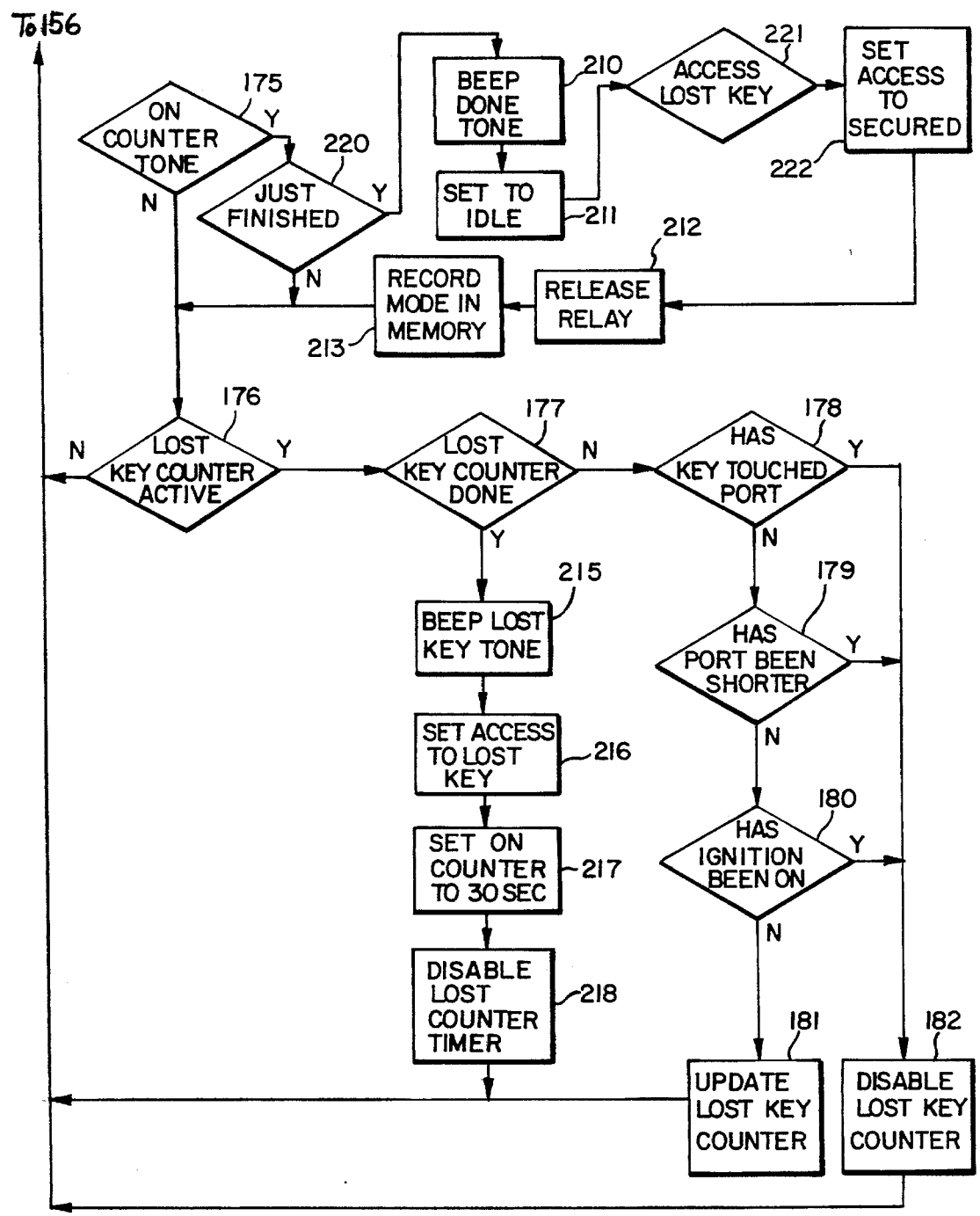

FIGS. 3A through 3C taken together set forth the operational flow diagram of the present invention vehicle security system. By way of overview, the operation of the present invention system will be undertaken in an order corresponding to that anticipated in the use of the system. Thus, initially the system operation following installation in the host vehicle is set forth afterwhich the system's program mode operation is described. Next, the normal operation of the system in response to authorized keys following successful programming is described. Thereafter, the special modes of operation such as valet mode and lost key reprogramming are described.

Thus, in the initial activation of the present invention system beginning at a start step 150 in FIG. 3A, the system moves to a step 151 in which the system is initialized. At the initialization step, various functions are performed which include setting all registers to known states turning the control relay (relay 26 in FIG. 1) off configuring the tone line to low logic state and configuring all other lines as inputs to integrated circuit 50 (seen in FIG. 2). The system then moves to step 152 in which the lost key counter within integrated circuit 50 (seen in FIG. 2) is started. The system then moves to step 153 in which a determination is made as to whether the memory is blank or has information stored therein. In the event information is stored within memory 153, the system moves through steps 154 and 155 prior to entering step 156 to set the system access to global or "any key access" and to write the global access to memory. In the event it is determined at step 153 that the memory is blank, the system then moves to step 156 in which a second timer known as the watchdog timer is cleared. The watchdog timer is also housed within integrated circuit 50 (seen in FIG. 2) and provides a counter which is continuously counting and is normally reset each time the system loops back through step 156. Following step 156, the system moves to step 158 in which a determination is made as to whether a computerized key such as key 13 has been inserted into receptacle 15 of keyport 12 (shown in FIG. 1). In the event the user has not yet applied a key to keyport 12, the system moves through step 168 to determine whether the system is in the program mode. In the event the system is not in the program mode, the system moves through steps 173 and 174 to determine whether the system is in on mode or valet mode. In the event the mode is neither valet nor on, the system moves through step 175 to determine whether the on counter which is another counter situated within integrated circuit 50 has completed its count. Assuming this counter has not completed, the system moves to 176 to determine whether the lost key counter whose operation was initiated at step 152 is active. Since the lost key counter is active, the system moves to step 177 to determine whether the lost key counter has completed its count. Assuming the lost key counter has not yet completed its count, the system moves through steps 178, 179 and 180 to determine whether a key has touched keyport receptacle 12 and if not whether the keyport has been shorted or attempt has been made to start the vehicle without application of a computerized key. Assuming the key has not yet touched the keyport and that the keyport has not been shorted nor the ignition operated, the system moves through step 181 to increment the lost key counter. In the event a key has touched the keyport or the keyport has been shorted or the ignition has been turned on, the system moves through step 182 in which the lost key counter housed within integrated circuit (seen in FIG. 2) is disabled. Following step 181 or 182, the system returns to step 156 at which point the watchdog timer is cleared. This basic loop describes the operation by which the system responds prior to the application of a key. Once a key has been applied by the user to keyport 12, the system responds at step 158 and moves to step 159 in which the key is read. The reading of the computerized key provides a sixty-four bit number which includes an eight bit family code, a forty-eight bit serial number and an eight bit CRC number. This number is read by integrated circuit 50 and analyzed at step 160 to determine whether the family code of the sixty-four bit number is recognized. In the event the family code is not recognized which corresponds to a determination that a foreign key or tampering device has been inserted, the system moves directly to step 168. In the event however the key presented is a genuine key of the type to which the system is to respond, the system moves to step 161 in which a determination is made as to whether access to the system has been set to global access. The global access described above provides the opportunity for the present invention system to enable the host vehicle in response to any bonified computerized key being applied to the key receptacle. In the event access has been set to global at steps 154 and 155 or step 167, the system moves to step 168 in which a determination is made as to whether the system is in the program mode. If however access has not been previously set to global, that is any key access, the system is then intended to respond solely to one of the specifically authorized keys prior to operation. Accordingly, in the event it is determined at step 161 that access is not global, the system moves to step 183 and determines whether access is set to lost key access. If not, the system moves to step 195 in which the remaining forty-eight bits of the serial number from the applied key is compared to the authorized list of keys stored within memory 70 (seen in FIG. 2). At step 196, a determination is made as to whether a match between the applied key and authorized key numbers has been found. If no match is found at step 196 or if access is in lost key access at step 183, the system moves directly to step 163. If however a key number match is found, the system determines at step 197 whether the system mode is set to programming mode. If the system is in programming mode, it moves directly to step 163. If not, however, it moves to step 162 setting the system mode to on and thereafter moving to step 163. At step 163, the duration of key application is examined for the required five second interval necessary to enter the valet mode. If the key has been held for five seconds, the system moves to step 164 and the system mode is set to valet afterwhich the system moves to step 165. In the event the key has not been applied for five seconds, the system moves to step 145. At step 145, a determination is made as to whether the key has been held within the receptacle for sixteen seconds. If so, the system moves to step 149 sounding a beep tone and thereafter moves to step 165. If the key is not held for sixteen seconds, the system moves to step 146 and tests for seventeen seconds, then to steps 147 and 148 to test for eighteen seconds and nineteen seconds respectively. At each of steps 146, 147 and 148, the system responds to the tested time by moving to step 149 and sounding a beep tone. Thus, if the key is held in the key receptacle beyond five seconds for at least sixteen seconds, the system will cycle through step 149 producing beep tones until it is determined at step 165 that the key has been held for more than twenty seconds. It should be recalled that the key must be held in the key receptacle for the required twenty seconds interval to enter the program mode. So long as the key has not been held for twenty seconds, the system moves directly to step 168. However, once the key has been held in the receptacle for twenty seconds, the system moves through steps 166 and 167 prior to moving to step 168 in order to set the system mode to program and to set the system access to global operation.

At step 168 the system then moves through steps 168 and since the system is not in the program mode at this point, the system then returns to step 156 through steps 173 through 181 or 182 to step 156 in the above-described operational loop. As the system loops through this operational sequence each time the system reaches step 158 and the user has continued to apply an authorized key to the keyport, the system loops through steps 158, 159, 160, 161, 195, 196, 197, 162 and 163. As this looping process continues, the five second interval examined at step 163 is satisfied and the system moves to step 164 at which point the mode is set to valet mode. The system then moves to step 165 and again determines whether the key has been set for the required twenty seconds needed to enter the program mode. In the event twenty seconds has not yet elapsed, the system moves from step 165 through 168 to step 173. At step 173, the system determines that the mode has been set to valet mode and as a result moves from step 173 to step 200 in which a determination is made as to whether the key is present. Assuming the key is applied to the key receptacle by the user desiring to enter the program mode, the system moves to a step 199 in which a determination is made as to whether the key has just touched the receptacle. If not, the system moves to step 174. If the key has just touched, the system then moves to step 201 in which a pair of short beep tones indicative of the on mode of the system are sounded afterwhich the system moves to steps 202, 203 and 204 to turn on the control relay and start the on counter. Following step 204, the system records the on mode in memory at step 205 and moves to step 174. At step 174, a determination is made as to whether the system is in valet mode. If so, the system moves to step 214 to determine whether the valet mode has just been entered. Assuming the valet mode has just been entered, the system moves to step 194 at which two long beeps indicative of valet mode operation are sounded and the relay is again maintained in the on position. Thereafter, the valet mode is recorded in memory at step 208 and following the restart of the on counter at step 209 the system moves to step 175. Because the system has been set to valet mode at step 205, the system then moves from step 175 to step 176 and determines that the lost key counter is not active and as a result returns to step 156.

Since it is assumed that the user is attempting to enter the program mode and thus continues to maintain the application of the computerized key to the key receptacle, the system will continue to loop through the above-described process until it is determined at step 165 that the computerized key has been held within the receptacle for twenty seconds. The sole change in the looping process which results during the additional fifteen seconds following the accumulation of five seconds of key application and enters the valet mode prior to entering the program mode is the system response at step 214. As the system continues to loop through step 174, the system on successive loops determines at step 214 that the valet mode entered at step 164 has not been just entered and thus the system does not pass through steps 194, 207 and 208 but rather proceeds directly to step 209. Otherwise, the looping continues until the twenty second interval is satisfied at step 165. Thus, once twenty seconds have passed, the system moves from step 165 to step 166 rather than directly to step 168. At steps 166 and 167, the system then sets the system to program mode and the access to global. Thereafter, at step 168 it is determined that the system has entered the program mode and as a result moves to step 169 at which a determination is made as to whether the program mode has just been entered. In the event the program mode has just been entered, the system moves through step 170, 171 and 172 to cause a program mode tone sequence comprising four short beeps and one long beep to be sounded and to pull the control relay and start the program counter. Thereafter, the system moves to step 173. Since the system is now in the program mode, the system moves directly through steps 173 and 174 and step 175 to step 176. Since the lost key counter has been disabled, the system returns to step 156 and the watchdog timer is again cleared.

In the anticipated operation of the present invention system described above, the user responds to the audible indication of program mode provided at step 170 by removing the applied key from the keyport and begins the process of presenting additional keys for authorization. Thus, at step 158, a determination is made as to whether the user has applied a key (presumably a new to-be-authorized key) to the keyport. In the event the user has not yet applied the next key to the keyport, the system loops through the above-described loop and returns to step 158. This looping process continues until a key has been applied to the key receptacle and it is determined at step 158 that a key is present. Thereafter, the system moves to step 159 to read the key and through steps 160 and 161 to determine whether the key is the correct type of key and whether access has been set to global. Since access has been set to global at step 167, the system then moves to step 197 and finding the mode set to program moves to step 163. Because the system has been previously set to program mode at step 166, the system moves to step 168 via step 145 and thereafter to step 169. Since the program mode has not just been entered, the system moves from step 169 to step 185 to again determine that a new key has been placed within the keyport. So long as a key is present in the keyport, the system moves to step 186 to store the forty-eight bit serial number of the key in memory and thereafter to step 187 to provide a short beep tone indicating to the user that the key has been recorded and stimulating the user to remove the key. Because the present invention system is configured to accommodate a maximum of twenty keys, the system determines at step 188 whether the twentieth key has yet been presented. In the event the twentieth key has been presented, the system moves through steps 191 through 193 to set the system mode to off and indicate the termination of the program mode by a long beep tone afterwhich the control relay is released. The system then moves to step 190 in which system access is set to secured access which is characterized by enabling the vehicle solely in response to the application of an authorized computerized key. The system provides a time limit for operation of the program mode which is timed by the program counter. Thus, following step 188, in the event the twentieth key has not been presented, the system further checks at step 189 as to whether the program counter has completed its count indicating the end of a program interval. In the event the program interval has not ended, the system moves to step 190 directly. If however the program interval has been completed, the system moves through steps 191, 192 and 193 prior to entering step 190.

This process continues as the user presents a succession of keys to the system for authorization and the system stores each presented key as an authorized key number within memory. Once the program mode has been completed, the system is ready for normal operations.

In describing the normal operation of the present invention system, it will be assumed that the above-described program mode operation has been completed and one or more keys have been authorized for use in the system and that the system access has been set to secured access. Thus, the system will respond solely to the presentation of an authorized computerized key. Thus, in normal operation, the system starts at step 150 and following step 151 in which the system is initialized in the above-described manner, the system moves to step 152 and starts the lost key counter. Thereafter, a determination is made at step 153 as to whether the system memory is blank. Since it is assumed that key authorization has taken place during the above-described programming step, the memory is not blank and the system moves directly to step 156 in which the watchdog timer is cleared. The system then moves to step 158 to determine whether a key has been placed within the receptacle. In the event no key has been placed within the receptacle, the system loops through steps 168, 173, 174, 175 and 176 back to step 156 clearing the watchdog timer. This loop continues until the user has applied a key to the keyport at which point a determination is made at step 158 that a key has been detected and at step 159 the system reads the key. At step 160, the system determines the key presented is the appropriate family of computerized keys and thereafter determines at step 161 whether system access is global. It should be recalled that following the program operation at step 190, the system access is set to secured. Thus, the system moves from step 161 to step 195 to compare the forty-eight bit serial number transmitted by the computerized key to the list of authorized key numbers within memory. In the event a match is found at step 196, the system moves to step 197 to determine whether the system is in the program mode. In the event the applied key does not match the authorized list of key numbers, the system moves directly to step 163 and thereafter through steps 163, 165, 168, 173, 174, 175 and 176 afterwhich it returns to step 156. Thus, in this manner, the system has denied access to an unauthorized key.

If however the number transmitted by the applied key matches an authorized key number, the system moves from step 196 to step 197 to determine whether the system is in the program mode. Since the system is not in the program mode, it moves to step 162 setting the system mode to on or enabling the vehicle and thereafter moves through steps 163, 165 and 168 to step 173. At step 173, it is determined that the system is in the on mode and thus the system moves to step 200. Since the user is applying the key to the keyport to enable the vehicle, it will be determined at step 200 that a key is detected and the system will move to step 201 at which point two short beep tones are provided to indicate the system configuration is in the on mode. Thereafter, the system will move to step 202 in which the control relay is pulled enabling the vehicle. The system then moves through steps 204 and 205 to start the on counter and record the on mode in memory. Thereafter, the system moves through step 174 to step 175. At step 175, a determination is made as to whether the on counter has completed its count. The on counter provides a time interval following the system's recognition of an authorized key for the vehicle operator to actually start the vehicle. Following the expiration of this interval, the system again disables the host vehicle. Accordingly, in the event it is determined at step 175 that the on counter has not completed its interval, the system moves through step 176 and returns to step 156 clearing the watchdog counter. If however it is determined at step 175 that the on counter has completed its interval, the system moves to step 220 to determine whether the on counter has just finished its count. If not, the system moves to step 176 directly. If so, the system moves to step 210 in which a beep tone is provided indicating the end of the starting interval following which the system moves through steps 211, 212 and 213 to set the system mode in idle and release the control relay. Thus, in the event the user has failed to start the vehicle during this on time, the system has again become disabled and the user must again present the authorized key to the keyport to start the vehicle.

In the event the user desires to configure the system in the valet mode which is characterized by enabling the vehicle without any computerized key being presented, the user must initially apply an authorized key to the keyport and maintain the key in the keyport for the required five second interval timed at step 163. Thus, assuming the system has been configured for normal operation described above, the user enters the valet mode by applying an authorized key to the keyport and holding the key. The system moves through steps 150 through 153 in the manner described above and determines at step 153 that the memory is not blank due to the stored authorized key numbers therein. The system then moves to step 156 clearing the watchdog timer afterwhich the key is detected at step 158 and the system moves to step 159 to read the key. At step 160, the family code of the applied key is recognized and the system moves to step 161 to determine whether the access is global. Since the access is not global but rather has been set at secured in the above operation, the system then moves to step 195 to compare the key number to the list of authorized key numbers within memory. Once it is determined at step 196 that the key number transmitted corresponds to an authorized key number, the system moves to step 197 and following a determination that the system is not in the program mode moves to step 162 setting the system mode to on. Thereafter, the system moves to step 163 to determine whether the applied key has been held for five seconds. As the key has been initially applied, the system moves from step 163 through step 165 to step 168. Since the system is not in the program mode, the system moves to step 173 and following a determination that the system is in the on mode, moves through steps 201 through 205 in the above-described operation in which two short beep tones indicating on mode are communicated to the user and the system control relay is pulled afterwhich the on counter is started and the on mode is recorded in memory. Thereafter, the system having not yet entered the valet mode moves through steps 174 through 181 and returns to step 156 clearing the watchdog counter. This looping process continues until a determination is made at step 163 that the applied key has been held within the key receptacle for five seconds. Once this determination is made, the system moves to step 164 and sets the system mode to valet mode. Thereafter, the system moves through steps 165 and 168 to step 173. At step 173, it is determined that the system is in valet mode and the system moves to step 200. Since the user has continued to apply the key, the system moves from step 200 through 201, 202, 204 and 205 to pull the control relay, start the on counter and record the valet mode in memory. The system then determines at step 174 that the system is in valet mode and moves to step 214 to determine whether the valet mode has just been entered. Since the valet mode has just been entered, the system moves to steps 194, 207 and 208 in which the valet mode tone is sounded, the control relay is pulled and the valet mode is recorded in memory. The system then moves to step 209 to restart the on counter and thereafter through steps 175 through 181 to return to step 156 and clear the watchdog counter.

The system is now configured in the valet mode and the system continues to loop through the above-described process until the user responds to the valet mode tone provided at step 194 by removing the key from the key receptacle. The looping which continues once the system has entered the valet mode and prior to the user's response to the valet mode tone and removal of the applied computerized key is the same on successive loops with the exception of the system response at step 214. After the first loop through the above-described process following the entry to the valet mode, successive loops through the process do not pass through steps 194, 207 and 208 but instead go directly from step 214 to step 209 and thereafter to step 175. Following the presentation of the valet mode tone, the user then removes the key from the receptacle and the system then begins looping in its basic mode in which a key is not detected at step 158 and thus the system moves from step 156 through steps 158, 168, 173, 200, 206, 174, 175 and 176 to return to step 156 and clear the watchdog timer. As a result, the system remains in valet mode until the user returns the system to its normal secured mode. This is accomplished by the user placing an authorized key within the keyport causing the system to determine at step 158 that a key is detected and again moved through steps 159, 160, 161 and 195. Once the key is determined to be an authorized key at step 196 and that the system is not in the program mode at step 197, the system will move through step 162 setting the system mode to on. This disables the valet mode and the user simply removes the applied key prior to the five second interval examined at step 163. As a result, the system then moves through steps 163, 165 and 168 to return to the basic system operational loop passing through steps 173 through 181 and returning to step 156. The system is now returned to its normal secured operation and will respond solely to authorized keys.

To enable the user to reprogram the present invention system in the event the user has lost all authorized keys, the system includes a lost key function which permits the user to return the system to the program mode and thereby authorize a new set of keys to the exclusion of the previously authorized keys. The procedure for activating the lost key mode of operation of the present invention system involves removing all operative power from the system to initialize the system. This is accomplished in the preferred configuration of the present invention system by removing the power coupling of the system from both the internal battery and the vehicle battery connection at output terminal 82 of voltage regulator 80 (seen in FIG. 2) for ten seconds and then reconnecting and thereafter waiting a thirty-minute interval while the system enters the lost key mode. During the thirty-minute waiting interval, the user must refrain from applying any keys to the keyport and from attempting to start the vehicle. During this thirty-minute interval, the system goes through the following process beginning at step 150 and at step 151 the system is initialized following which the system moves to step 152 and starts the lost key counter. The system then moves through step 153 to step 156 and the watchdog timer is cleared. Since no key is presented, the system moves through step 158 to step 168. Since the system is not in program, valet, or on mode the system moves through steps 173, 174, 175 to step 176. At step 176, a determination is made that the lost key counter which was started at step 152 is active. The system then moves to step 177 and since the thirty-minute interval has not passed, the system moves from step 177 to step 178. At steps 178, 179 and 180, the system determines whether a key has touched the port, whether the ignition has been turned or whether the port has been shorted. Since the user refrains from any such activities during the lost key interval, the system moves to step 181 and increments the lost key counter. Thereafter, the system returns to step 156 clearing the watchdog counter. The system continues to loop through the above-described functional steps with each successive loop causing the lost key counter to be incremented at step 181 until the lost key counter has reached the thirty-minute lost key interval. Once the lost key counter has reached the thirty-minute interval, a determination is made at step 177 that the lost key counter has completed its count and the system moves to step 215 at which point a lost key tone comprising three short beeps is produced. Thereafter, the system moves to step 216 at which access is set to lost key access following which the system moves to steps 217 and 218 to set the on counter to thirty seconds and to disable the lost key counter. The system then returns to step 156 clearing the watchdog counter. In response to the audible lost key tone, the user then has a thirty second interval to present the first key to be authorized from among the replacement keys. The system continues to loop through steps 156, 158, 168 and steps 173 through 177 as well as steps 215 through 218 and returning to step 156 until the thirty second on counter has timed out. Once the on counter has timed out and a key has not been presented, the system is unable to accept a new key for authorization. If, however, the user applies a to-be-authorized key to the key receptacle within the thirty second interval, this key application is detected at step 158 and the system proceeds through steps 159 and 160 to step 161 in which the access having been set to lost key access at step 216 causes the system to move to step 162 and set the mode to on. Thereafter, the system moves through steps 163 and 165 and returns to the main loop at step 168. The user then maintains the key within the keyport for the twenty seconds required to enter the program mode and, in the manner described above for entry into the program mode, the user is able to enter the program mode and authorize the newly acquired replacement keys.

Each time the host vehicle is operated in the normal secured access on mode, the system returns to a deactivated or disable condition when the vehicle remains in a nonoperating condition for thirty seconds. Thus, once the user has stopped operating the vehicle, the system moves through the functional loop which includes steps 156, 158 and 168 to arrive at step 173. At step 173, a determination is made that the system is in the on mode afterwhich the system moves to step 200 and determines that a computerized key is not present in the keyport. As a result, the system moves to step 206 and increments the on counter. It should be recalled that during the normal operation of the vehicle, the on counter is started at step 204. Following the incrementing of the on counter at step 206, the system moves through step 174 to step 175 to determine whether the on counter has completed its count. In the event the on counter has not completed its count, the system moves to step 176 where it is determined that the lost key counter is not active and thus the system returns to step 156 clearing the watchdog counter. In the absence of a key at the keyport, the system continues to loop through the functions set forth in steps 156, 158, 168, 173, 200, 206, 174, 175 and 176 until the on counter has been incremented a sufficient number of times to complete its count. Thereafter, on the next loop through step 175, the system responds to the on counter having completed its count and moves to step 210 to provide an audible tone indicating that the vehicle has been returned to the disabled condition. Thereafter, the system moves to step 211 in which the mode is set to idle. The system moves from step 211 to step 221 at which a determination is made as to whether the system is set to lost key access. If not, the system moves to step 212. If system access is lost key, the system moves to step 222 and the access is set to secured. The system then moves through steps 212 and 213 in which the control relay is released rendering the vehicle unable to be started and the idle mode is recorded in memory. The system then continues to move through the basic functional loop of steps 156, 158, 168, 173, 174, 175 and 176 until a key is applied by the user and detected at step 158.

The above-described system provides a novel vehicle security system in which all operation and programming is controlled by the user utilizing a single computerized key. Thus, all functions of the present invention system ranging from simple activation to changes of operational mode as well as system programming are carried forward by simple application of a computerized key to the keyport. The system utilizes the duration of key application as the input information to enable the system to interpret the user's commands. This avoids the need for extensive keyboard input which has been found by users to be complicated and cumbersome and, in some instances, actually baffling. The system protects the security integrity by avoiding the need for the user to place sensitive information or numeric codes in the hands of other individuals. The system further protects against the need for entrusting enabling keys to other individuals such as parking lot attendants or the like to enable their operation of the vehicle. The system further provides a lost key restoration which avoids the need for service by the manufacturer or a trained technician without compromising the security of the vehicle at any time. All aspects of the present invention system operation are protected against intruders by the novel use of the computerized key and the system operation described above.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. A vehicle security system for use in a vehicle having an engine, said vehicle security system comprising:

means for disabling said vehicle by preventing starting and operation of its engine;

a computerized key having means for transmitting a key number;

a keyport having means for coupling to said computerized key;

indicator means responsive to an input signal for producing system response indications;

memory means for storing a plurality of authorized key numbers;

processor means operatively coupled to said memory means to provide communication therebetween, said keyport, said means for disabling and said indicator means and having means for receiving said key number and for determining whether said key number matches one of said authorized key numbers;

means for timing the duration of coupling of said computerized key to said keyport;

mode means, responsive to said means for timing, for configuring said vehicle security system in a normal mode in which a computerized key is required for activation of said engine and for reconfiguring said vehicle security system in a valet mode in which no computerized key is required for activation of said engine once said means for timing exceeds a first time duration; and said processor means causing said means for disabling to disable said vehicle and maintaining it disabled until said computerized key is received within said keyport and determined to match one of said authorized key numbers and producing said input signal applied to said indicator means to produce a system response indicator indicative of acceptance of said computerized key and activation of said vehicle in response to said match.

2. A vehicle security system as set forth in claim 1 wherein said mode means includes means for configuring said vehicle security system in a program mode in which a plurality of computerized key numbers may be received seriatim in said keyport and stored within said plurality of authorized key numbers.

3. A vehicle security system as set forth in claim 2 wherein said vehicle includes a battery coupled to said vehicle security system supplying operative power thereto and wherein said processor means includes means for causing said mode means to configure said vehicle security system in said program mode when said battery is disconnected for a first time interval, reconnected and following reconnection of said battery no computerized key is applied to said keyport and no attempt is made to activate said engine for a second time interval and a computerized key is applied to said keyport following said second time interval and maintained at said keyport for a third time interval.

4. A vehicle security system as set forth in claim 3 wherein said mode means includes means for configuring said vehicle security system in a global mode, in which the application of one of said computerized keys to said keyport will enable activation of said engine, once said program mode has been entered and no computerized key is applied to said keyport for a second time duration.

5. A vehicle security system method for use in a vehicle, said method comprising the steps of:

providing means for disabling said vehicle in the absence of an on signal;

providing a number transmitting key and a keyport for receiving a coupling portion of said number transmitting key;

configuring the vehicle security system in a normal mode in which said key must be applied to said keyport to enable said vehicle;

sensing the application of said key to said keyport and receiving its transmitted number;

comparing said transmitted number to one or more stored authorized numbers;

producing said on signal if said transmitted number matches one of said stored authorized number;

timing the duration of application of said number transmitting key to said keyport; and configuring the vehicle security system in a valet mode of operation in response to application of said number transmitting key to said keyport beyond a first time interval, said valet mode characterized by producing said on signal without application of a number transmitting key to said keyport.

6. The method of claim 5 further including the step of reconfiguring the vehicle security system from said valet mode to said normal mode in response to application of a number transmitting key to said keyport.

7. The method of claim 5 further including the steps of:

configuring the vehicle security system in a program mode of operation in response to application of said number transmitting key to said keyport beyond a second time interval;

establishing a program time interval;

storing each transmitted number from each number transmitting key applied to said keyport during said program interval as authorized numbers; and indicating the expiration of said program interval by producing a user perceptible indication.

8. The method of claim 7 further including the step of indicating the storing of each transmitted number applied to said keyport.

9. The method of claim 8 further including the steps of:

sensing the absence of applied number transmitting keys to said keyport during the entire program interval; and configuring the vehicle security system in an any key mode in which said on signal is produced in response to the application of any number transmitting key to said keyport.

10. The method of claim 9 further including the steps of:

disconnecting operative power from the vehicle security system for a first lost key interval;

reconnecting operative power to the vehicle security system;

monitoring the vehicle security system for the occurrence of either the application of a number transmitting key to said keyport or a user attempt to activate the vehicle for a second lost key interval;

configuring the vehicle security system in said program mode if neither a number transmitting key application nor a user attempt to activate the vehicle occurs during the second lost key interval; and indicating entry into said program mode.

11. The method of claim 5 further including the step of indicating configuration of the vehicle security system into the valet mode.

12. The method of claim 7 further including the step of indicating configuration of the vehicle security system into the program mode.

13. For use in a vehicle, a vehicle security system comprising:

a number transmitting key having a key number;

means for coupling to said key and reading the key number thereof;

means for preventing the starting and operation of said vehicle;

indicator means for indicating information to a vehicle user;

timing means for timing the duration of coupling of said key to said means for coupling; and processor means responsive to said timing means and said means for coupling to receive user input information based solely upon coupling of said number transmitting key to said means for coupling, the duration of said coupling and said key number to configure said vehicle security system in a selected one of a plurality of operating modes;

14. A vehicle security system as set forth in claim 13 wherein said processor means includes:

means for establishing a plurality of increasing length time intervals and for assigning a time interval to a plurality of said modes;

means for reading said timing means and comparing its output to said time intervals; and means for configuring said vehicle security system into each of said plurality of said modes so long as said key number transmitting key remains coupled to said means for coupling during the time interval assigned thereto.

\* \* \* \* \*